US008713361B2

(12) United States Patent
Gilani

(10) Patent No.: US 8,713,361 B2
(45) Date of Patent: Apr. 29, 2014

(54) ERROR PROTECTION FOR PIPELINE RESOURCES

(75) Inventor: Syed Zohaib M. Gilani, Madison, WI (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 429 days.

(21) Appl. No.: 13/100,632

(22) Filed: May 4, 2011

(65) Prior Publication Data

US 2012/0284570 A1 Nov. 8, 2012

(51) Int. Cl.
*G06F 11/00* (2006.01)

(52) U.S. Cl.
USPC ............................................. 714/10; 714/48

(58) Field of Classification Search
USPC ........................................................ 714/10, 48
See application file for complete search history.

(56) References Cited

U.S. PATENT DOCUMENTS

| 5,179,702 | A * | 1/1993 | Spix et al. ...................... 718/102 |
| 5,193,181 | A * | 3/1993 | Barlow et al. ...................... 714/2 |
| 6,751,759 | B1 * | 6/2004 | Sun et al. ......................... 714/55 |
| 6,772,370 | B1 * | 8/2004 | Sun et al. ......................... 714/33 |
| 7,954,038 | B2 * | 5/2011 | Racunas et al. ............... 714/763 |
| 2009/0187906 | A1 * | 7/2009 | Caprioli et al. ............... 718/101 |
| 2010/0031084 | A1 * | 2/2010 | Tremblay et al. ............... 714/13 |
| 2010/0131796 | A1 * | 5/2010 | Engelbrecht et al. ........... 714/15 |

OTHER PUBLICATIONS

Martin Dimitrov et al., "Locality-Based Information Redundancy for Processor Reliability," School of Electrical Engineering and Computer Science, University of Central Florida, date unknown, 8 pages.
Gokhan Memik et al., Engineering Over-Clocking: Reliability-Performance Trade-Offs for High-Performance Register Files, International Conference on Dependable Systems and Networks, 2005 IEEE, pp. 1-10.
Nicholas J. Wang et al., "ReStore: Symptom Based Soft Error Detection in Microprocessors," Department of Electrical and Computer Engineering, University of Illinois at Urbana-Champaign, 10 pages.

* cited by examiner

Primary Examiner — Joshua P Lottich

(57) ABSTRACT

At an instruction pipeline of a data processor, pipeline resource conflicts are detected by setting, for each executing instruction, one or more assignment indicators to indicate which pipeline resources are to be utilized for executing the instruction. The instruction pipeline detects a pipeline resource conflict if an instruction is assigned a pipeline resource for which the assignment indicator is set. In addition, for selected pipeline resources, such as registers in a register file, the instruction pipeline can detect a pipeline resource conflict if more than one instruction attempts to access the pipeline resource when the assignment indicator for the resource is set. In response to detecting a pipeline resource conflict, the instruction pipeline is flushed and returned to a checkpointed state, thereby protecting the instruction pipeline from architectural state errors.

20 Claims, 6 Drawing Sheets

ERROR PROTECTION FOR PIPELINE RESOURCES

BACKGROUND

1. Field of the Disclosure

The present disclosure generally relates to data processors, and more particularly to error protection for data processors.

2. Description of the Related Art

A data processor typically employs an instruction pipeline to execute instructions. Each instruction requires one or more pipeline resources, such as registers in a register file, entries in a reorder buffer or load/store queue, and the like, in order to execute. Accordingly, a portion of the instruction pipeline, such as the dispatch unit, is typically employed to dedicate, on a temporary basis, pipeline resources to an instruction. However, data corruption at the data processor, such as data corruption resulting from soft errors, can cause an architectural state error, whereby an instruction incorrectly accesses a resource assigned to a different instruction. Architectural state errors can be addressed by conventional error detection techniques, such as the use of error correcting codes (ECC) or redundant execution of each instruction. However, such techniques can have an undesirable impact on performance.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-6 illustrate devices and techniques for detecting pipeline resource conflicts by setting, for each executing instruction, one or more assignment indicators to indicate which pipeline resources are to be utilized for executing the instruction. The instruction pipeline detects a pipeline resource conflict if an instruction is assigned a pipeline resource for which the assignment indicator is set. In addition, for selected pipeline resources, such as registers in a register file, the instruction pipeline can detect a pipeline resource conflict if more than one instruction attempts to access the pipeline resource when the assignment indicator for the resource is set. In response to detecting a pipeline resource conflict, the instruction pipeline is flushed and returned to a checkpointed state, thereby protecting the instruction pipeline from architectural state errors.

To illustrate, when assigning pipeline resources to an instruction, a dispatch stage typically generates identifying information, such as an address, index, or tag, for each assigned resource. Under ordinary, error-free operation, the identifier generating module will not generate identifiers for pipeline resources that were previously assigned. However, the generating circuitry and the data path that communicates the identifying information are subject to soft errors such that an incorrect identifier is generated or communicated to an execution unit. Failure to detect such incorrect identifiers can result in multiple instructions accessing the same pipeline resource, resulting in program errors from which it is difficult to recover. By detecting pipeline resource conflicts, the data processor can take remedies, such as flushing the instruction pipeline and returning to a checkpointed state, before a program error takes place.

As used herein, a pipeline resource refers to a resource that is temporarily assigned to an instruction by an instruction pipeline for execution of the instruction, such that, in the absence of errors, a pipeline resource is only associated with a single instruction at a time. Examples of pipeline resources include registers of a data processor register file, entries of a reorder buffer (ROB), entries of a retire queue (RQ), and entries of a load/store queue (LSQ). As used herein, a processor's cache hierarchy, system memory, and similar memory devices are not pipeline resources, because the storage locations of these memories are not assigned by the instruction pipeline to be uniquely associated with an individual instruction on a temporary basis for execution of the instruction.

Figure 1:
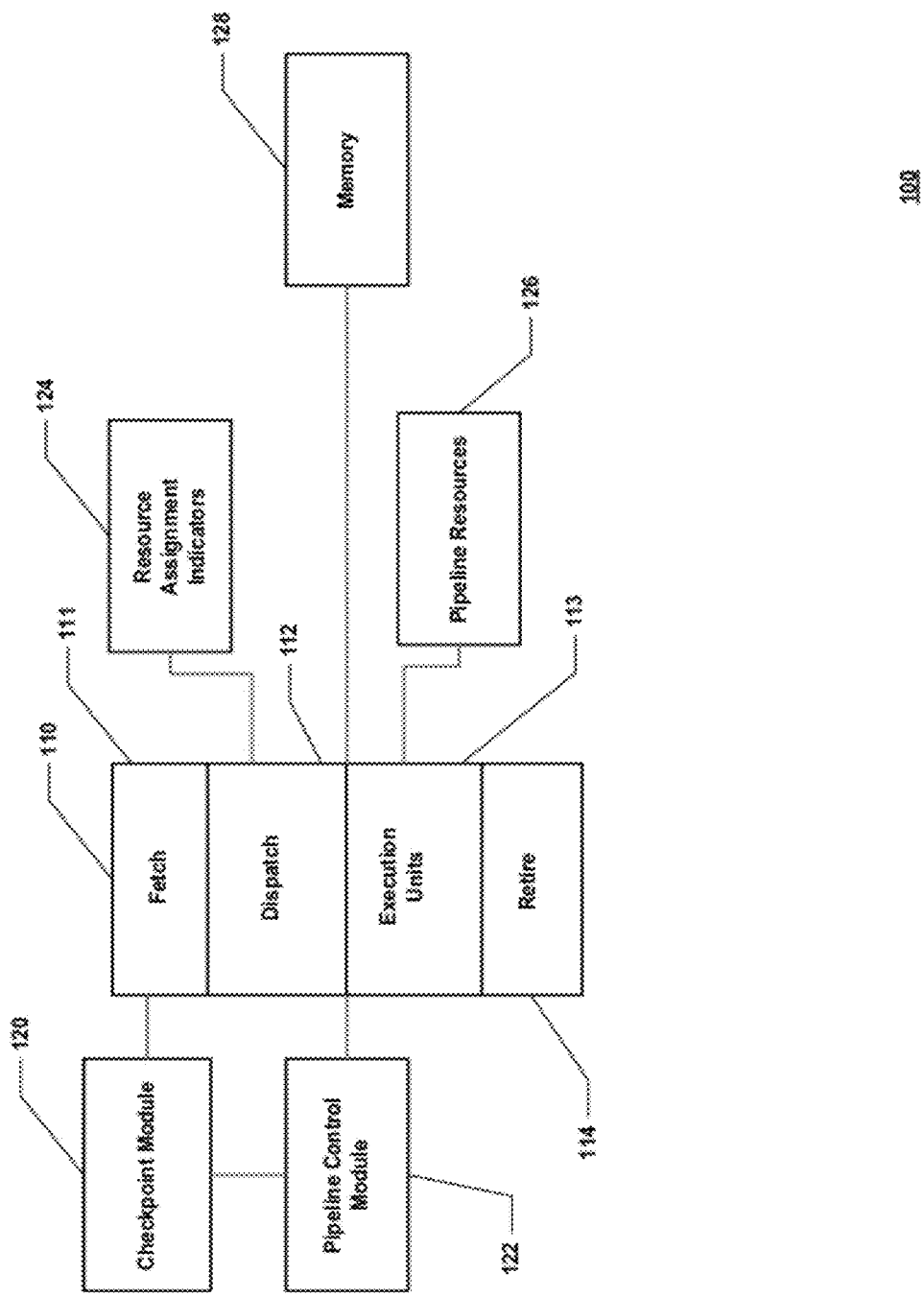
FIG. 1 is a block diagram of a data processor in accordance with one embodiment of the present disclosure.

FIG. 1 illustrates a block diagram of a data processing device 100 in accordance with one embodiment of the present disclosure. The data processing device 100 includes an instruction pipeline 110 connected to each of a checkpoint module 120, a pipeline control module 122, resource assignment indicators 124, pipeline resources 126, and memory 128. The instruction pipeline includes a fetch stage 111, a dispatch stage 112, execution units 113, and retire stage 114.

The instruction pipeline 110 employs the pipeline stages 110-114 to execute instructions. Accordingly, fetch stage 111 is configured to fetch instructions from an instruction queue (not shown). Fetch stage 111 can also include a decode stage (not shown) to decode fetched instructions into one or more operations. Dispatch unit 112 is configured to assign pipeline resources to each fetched instruction based on the type of instruction. Thus, for example, an operation, such as an ADD operation or load/store operation, that indicates an architectural register as a destination register can be assigned a physical register to correspond to the indicated architectural registers. A load or store operation can be assigned an entry in a load/store queue that determines the order of execution for the set of load and store operations to be executed. Dispatch stage 112 is further configured to dispatch instructions (or the decoded operations thereof) to one or more of the execution units 113 for execution.

The execution units 113 are each configured to execute one or more types of instructions or operations. For example, the execution units 113 can include one or more arithmetic execution units for execution of arithmetic operations, one or more load/store units for execution of load and store operations, and the like. The retire stage 114 receives indications from the execution units 113 when operations have been completed, and determines based on these indications whether an instruction is ready for retirement. The retire stage 114 is configured to retire instructions upon determining that all operations associated with an instruction have been completed, that any dependencies associated with the instruction have been resolved, and that any speculative aspects of the instruction have also been resolved.

Checkpoint module 120 is configured to store state information indicating the state of the instruction pipeline 111 and the pipeline resources 126 in response to instructions from pipeline control module 122. The stored state information is referred to herein as a checkpoint. Pipeline control module 122 instructs the checkpoint module 120 to store a checkpoint based on indications from the instruction pipeline 110 that particular types of instructions, such as speculative branch instructions, are to be executed. Pipeline control module 122 can also cause checkpoint module 120 to store checkpoints at periodic intervals. In addition, in response to an error indication from the instruction pipeline 110, the pipeline control module 122 can control the checkpoint module 120 to provide a checkpoint to the instruction pipeline 111, thereby returning the pipeline 110 to the state indicated by the checkpoint. The instruction pipeline 111 can generate the error message in response to any of a number of detected errors, including a mis-predicted branch or detection of a pipeline resource conflict.

In particular, during operation the dispatch stage 112 assigns a corresponding subset of the pipeline resources 126 to each received instruction. Each resource includes one or more corresponding assignment indicators at resource assignment indicators 124. In an embodiment, the resource assignment indicators 124 include one or more programmable storage locations, such as programmable registers, whereby each of the pipeline resources 126 corresponds to one or more register bits. Accordingly, the states of the register bits indicate the state of the corresponding pipeline resource. As used herein, an assignment indicator is in a set state when it is in a state to indicate that the indicator's corresponding pipeline resource has been assigned to an instruction. An assignment indicator is clear when it is in a state to indicate that the indicator's corresponding pipeline resource is not assigned to an instruction. It will be appreciated that any designated logic state can correspond to either the set or clear states. Thus, for example, in one embodiment a clear state is indicated by a register bit being set to a logic "1", or asserted state, and a set state is indicated by the register bit being set to a logic "0."

For some pipeline resources, such as registers of a register file, multiple register bits can be employed to indicate different states of the register. As described further herein, the different states can be employed to determine whether a register assigned to a single instruction is targeted as a destination by multiple instructions.

In response to assigning selected ones of the pipeline resources 126 to a received instruction, the dispatch stage 112 checks the corresponding ones of the resource assignment indicators 126. If any of the corresponding assignment indicators are set, indicating a resource assigned to the received instruction was previously assigned to an unretired instruction, the dispatch stage 112 indicates an error to the pipeline control module 122. In response the pipeline control module 122 flushes the instruction pipeline 112 and instructs the checkpoint module 120 to return the pipeline to a checkpointed state.

Retire stage 114 clears the assignment indicator for pipeline resource assigned to an instruction in response to retiring that instruction. In addition, the retire stage 114 or other stage of the instruction pipeline 110 can clear an assignment indicator for a pipeline resource assigned to an instruction in response to determining that the instruction is required to be repeated. For example, for some speculatively scheduled instructions, the instructions are dependent upon loads that may need to overwrite results in a pipeline resource, such as a register of a register file, depending upon the outcome of a speculative branch. Accordingly, in response to determining a mis-predicted branch, the retire stage 114, load/store unit at the execution units 113, or other module can set the assignment indicators so that writes to the pipeline resource can be repeated.

Figure 2:
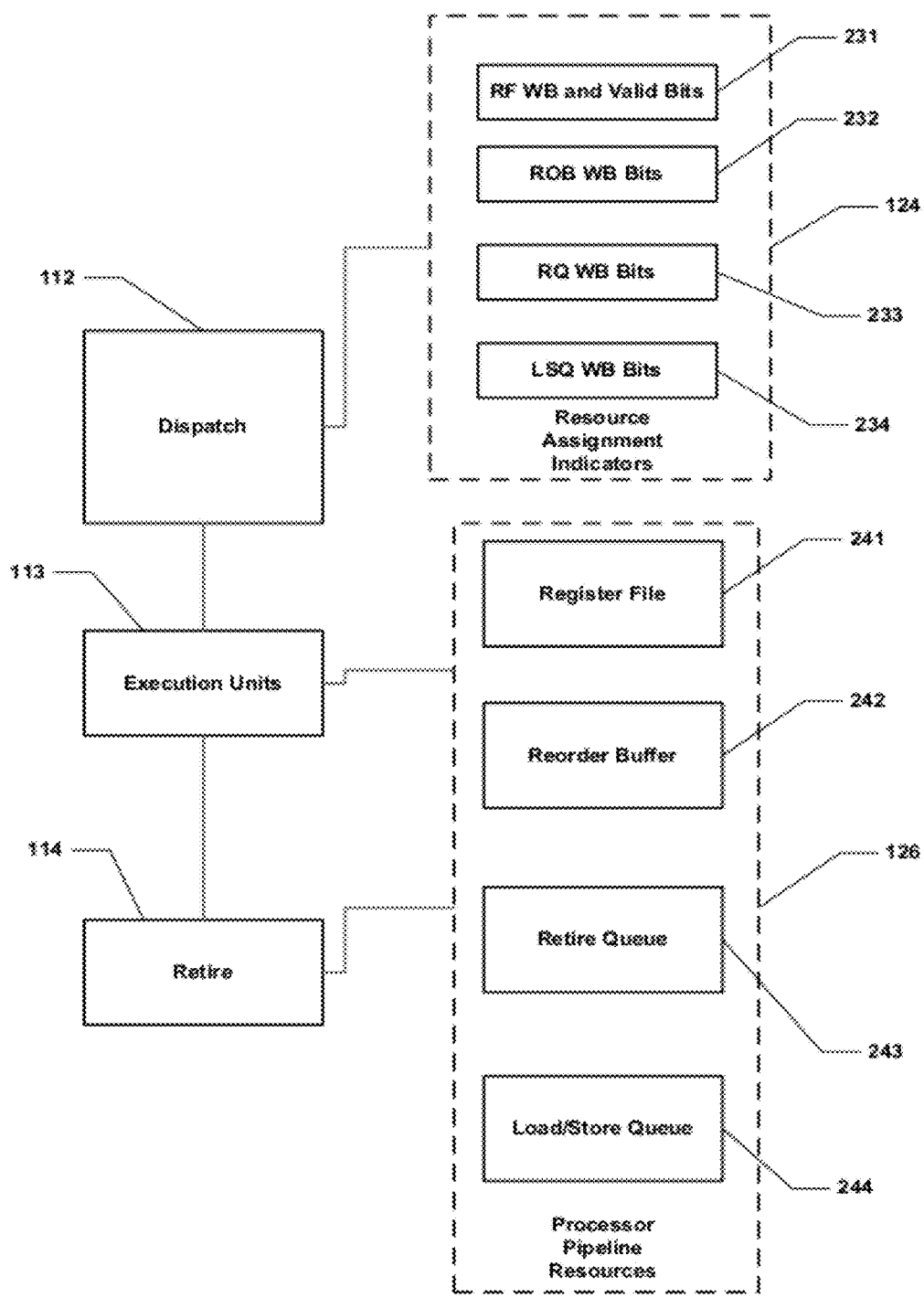
FIG. 2 is a block diagram of portions of the data processor of FIG. 1 in accordance with one embodiment of the present disclosure.
Figure 3:
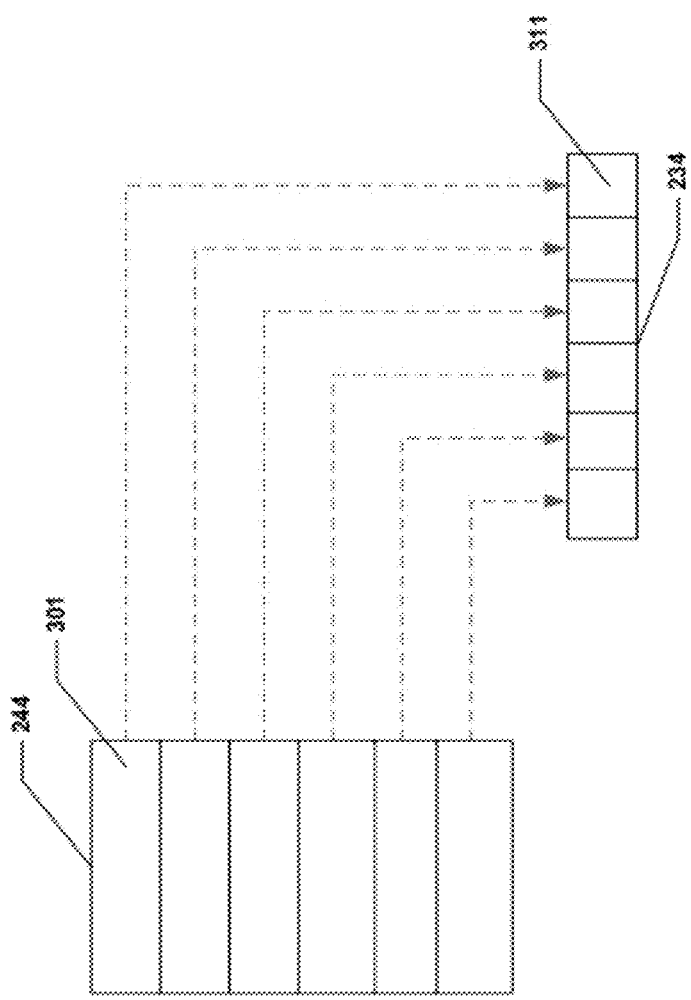
FIG. 3 is a block diagram of a pipeline resource and corresponding resource assignment indicators in accordance with one embodiment of the present disclosure.

Example pipeline resources and corresponding assignment indicators in accordance with one embodiment of the present disclosure are illustrated at FIG. 2. In the example of FIG. 2, the assignment indicators are recorded in the form of writeback (WB) bits. In particular, FIG. 2 illustrates a register file (RF) 241 and corresponding RF WB and valid bits 231, a reorder buffer (ROB) 242 and corresponding ROB WB bits 232, a retire queue (RQ) 243 and corresponding RQ WB bits 233, and a load/store queue (LSQ) 244 and corresponding LSQ WB bits 234.

Each of the pipeline resources 124 illustrated at FIG. 2 includes a number of storage locations, with corresponding number of assignment indicators. This can be better understood with reference to FIG. 3 which illustrates an example LSQ 244 and corresponding LSQ WB bits 234. The LSQ 244 includes a set of storage locations, such as storage location 301, where each storage location in the set is configured to store information associated with a corresponding load/store instruction. The storage locations of the LSQ 244 are individually addressable according to location identifier information, such as an index or tag. Each storage location of the LSQ 244 includes a corresponding set of WB bits, as illustrated by the dashed arrows of FIG. 2. Thus, for example, the WB bits 302 correspond to the storage location 301 of the LSQ 244. In an embodiment, the WB bits corresponding to a storage location can be indexed by similar information as that used to index the storage location.

In operation, the dispatch stage 112, in response to receiving an instruction, determines the types of pipeline resources the instruction requires for execution. For each type of required pipeline resource, the dispatch stage 112 requests addressing circuitry to provide location identifier information for one or more storage locations of the resource type that are not currently assigned to other instructions. Thus, for example, in response to determining that an instruction requires a storage location in the LSQ 244, the dispatch stage 112 requests the addressing circuitry to provide a storage location at the LSQ 244 that is not currently assigned to an instruction. Those storage locations not currently assigned to an instruction are referred to as being on a freelist. Accordingly, in response to a request from the dispatch stage 112, the addressing circuitry determines a storage location on the freelist for the requested pipeline resource, and provides location identification information for the determined storage location. In response to receiving the location identification information, the dispatch stage 112 checks the assignment indicator for the storage location indicated by the location identification information. If the assignment indicator is in a clear state, the dispatch stage 112 sets the assignment indicator and proceeds with instruction dispatch. If the assignment indicator is in a set state, the dispatch stage indicates an error.

Figure 4:
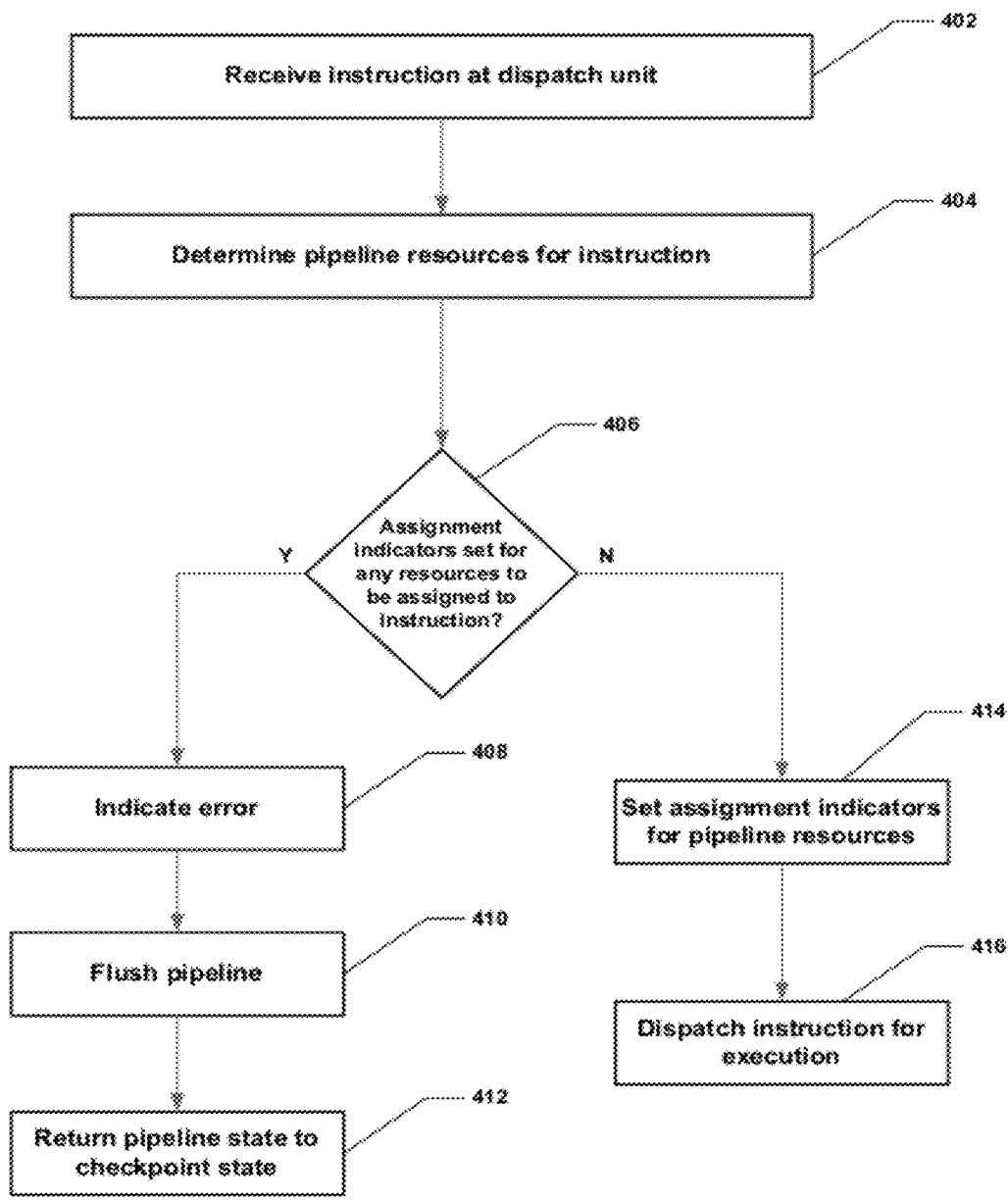
FIG. 4 is a flow diagram of a method of detecting pipeline resource conflicts in accordance with an embodiment of the present disclosure.
Figure 5:
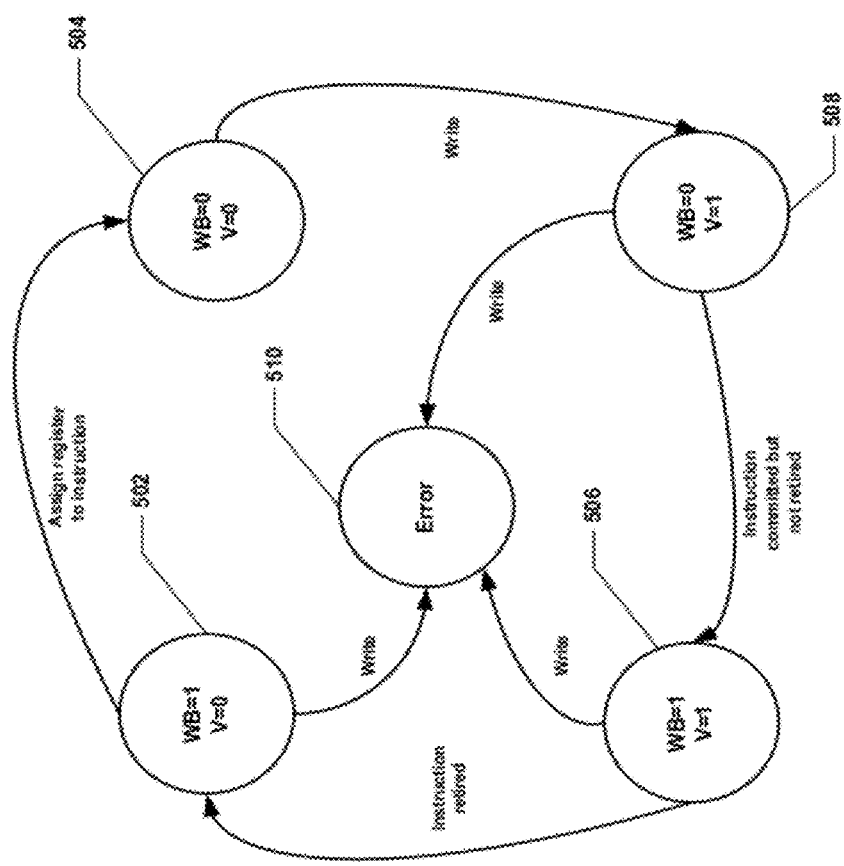
FIG. 5 is a state diagram illustrating detection of register file conflicts in accordance with an embodiment of the present disclosure.

Operation of the instruction pipeline 110 can be better understood with reference to FIG. 4, which illustrates a method of detecting pipeline resource conflicts in accordance with one embodiment of the present disclosure. At block 402, the dispatch stage 112 receives an instruction. At block 404 the dispatch stage 112 determines the pipeline resources required to execute the instruction. At block 406, the dispatch stage 112 determines the particular storage locations to be assigned to the instruction for each determined pipeline resource, and determines if any of the assignment indicators are set for those storage locations. If not, the dispatch stage sets the assignment indicators for those storage locations at block 414 and, at block 416 dispatches the instruction, or operations based thereon, to the execution units 113 for execution.

If, at block 406, the dispatch stage 113 determines that an assignment indicator for a storage location to be assigned to the received instruction is set, it indicates an error to the pipeline control module 122 at block 408. In response, the pipeline control module 122 flushes the pipeline at block 410 and, at block 412, returns the instruction pipeline 110 to a checkpointed state stored at the checkpoint module 120.

Accordingly, in the example of FIG. 4, the instruction pipeline 110 can determine at the dispatch stage 112 whether pipeline resources are assigned to multiple instructions. By using additional assignment indicators for designated pipeline resources, the instruction pipeline 110 can also determine whether multiple instructions, during execution, attempt to access a particular pipeline resource. For example, by using both a write-back (WB) bit and a validity (V) bit for each physical register in the register file 241, the instruction pipeline 110 can determine whether multiple executing instructions attempt to write a physical register assigned to only one instruction. This can be better understood with reference to FIG. 5, which illustrates a state diagram for the WB bit and V bit for a particular physical register of the register file 241 in accordance with one embodiment of the present disclosure. In the illustrated embodiment, a WB value of 0 indicates the physical register is not assigned to an instruction and a WB value of 1 indicates the physical register has been assigned to an instruction. A V value of 0 indicates the physical register has not been written after it was assigned to an instruction, while a V value of 1 indicates that the register has been written after being assigned.

At state 502, the physical register has not been assigned and has not been written. Accordingly, a write to the register indicates an instruction has written to a register which was not assigned to that instruction. The state therefore moves to state 510, where the instruction pipeline 110 indicates an error to the pipeline control module 124. If the physical register is assigned to an instruction by the dispatch stage 112, the state is placed at state 504 and the WB bit is set to 0.

At state 504, because no write to the physical register has taken place, a write to the register is allowed. Accordingly, a write to the register places the state at state 508, where the V bit is set to 1 to indicate the write has taken place. At state 508, a write to the physical register indicates that more than one instruction has attempted to write to the register, and the state therefore transitions to state 510 where the error is indicated. If a second write to the physical register is not attempted, and the instruction to which the register is assigned is completed but not yet retired, the state transitions to state 506 where the WB bit is set to one.

At state 506, a write to the physical register indicates that that more than one instruction has attempted to write to the register, and the state therefore transitions to state 510 where the error is indicated. If a second write to the physical register is not attempted, and the instruction to which the register is assigned is retired, the state transitions to state 502 where the V bit is set to zero, thus indicating that the physical register is available for assignment to another instruction.

Figure 6:
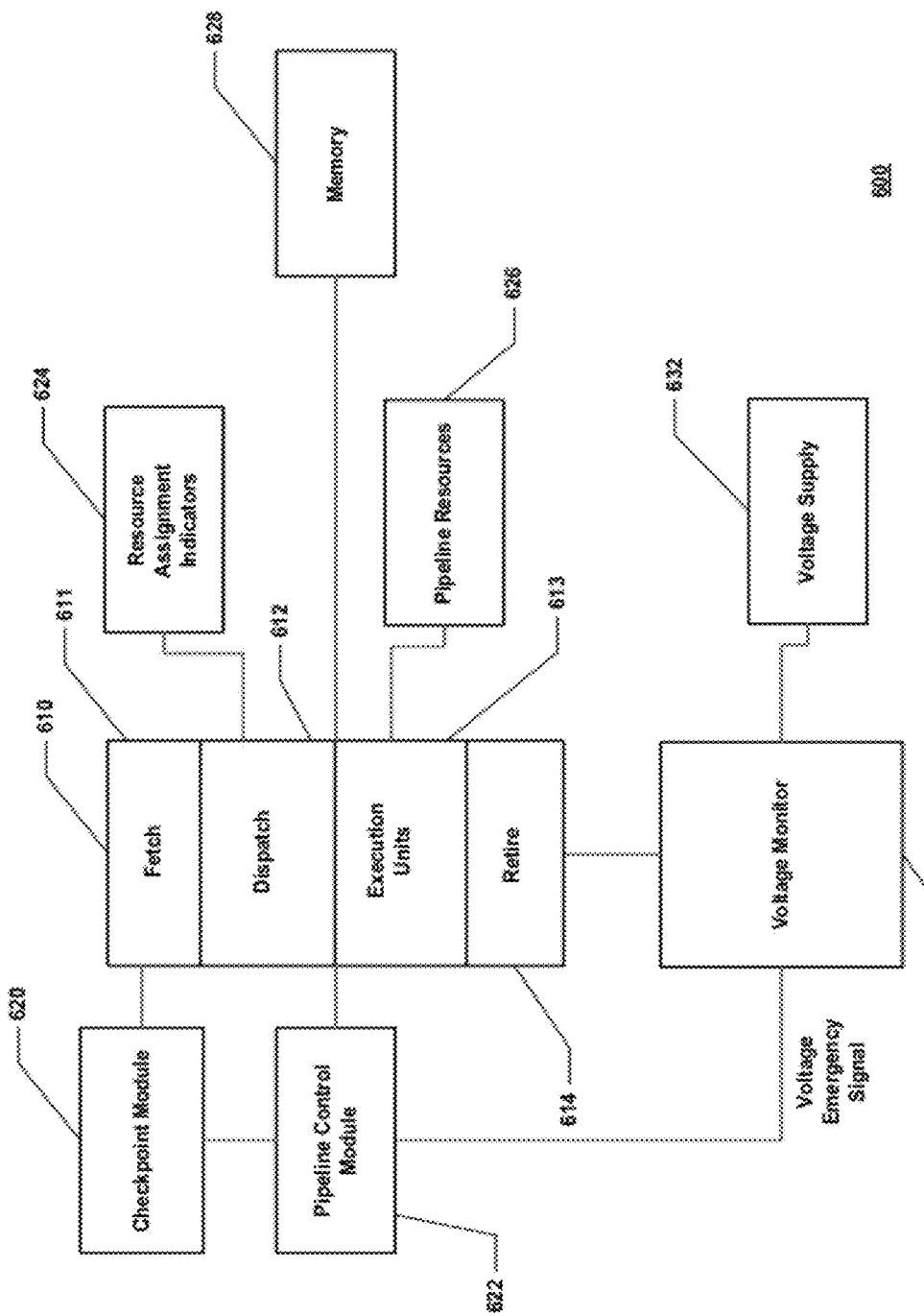
FIG. 6 is a block diagram of a data processor in accordance with another embodiment of the present disclosure.

FIG. 6 illustrates a data processor 600 in accordance with another embodiment of the present disclosure. The data processing device 600 includes an instruction pipeline 610 connected to each of a checkpoint module 620, a pipeline control module 622, resource assignment indicators 624, pipeline resources 626, and memory 628. The instruction pipeline includes a fetch stage 611, a dispatch stage 612, execution units 613, and retire stage 614. Each of these modules illustrated at FIG. 6 is configured similarly to the corresponding modules of FIG. 1. In addition, the data processing device 600 includes a voltage supply 632 and a voltage monitor 630.

The voltage supply 632 is a voltage source, such as a battery, voltage converter, and the like, that supplies a voltage to the circuitry supporting operation of the instruction pipeline 610. In an embodiment, the voltage supplied by voltage supply 632 is subject to fluctuations, including extreme fluctuations that can cause errors in the operation of the instruction pipeline 610. Such extreme fluctuations are referred to herein as voltage emergencies.

Voltage monitor 630 includes circuitry to monitor the voltage supplied by voltage supply 632. In response to detecting that a voltage emergency has occurred, the voltage monitor 630 asserts a voltage emergency signal to indicate to the pipeline control module 622 that the operation of the instruction pipeline 110 may have been impacted by a voltage fluctuation. In response, the pipeline control module 622 can flush the instruction pipeline 110 and return it to a checkpointed state.

In an embodiment, instructions whose execution may have been impacted by a voltage emergency may reach the retire stage 614 before the voltage monitor 630 can detect and signal the voltage emergency. Accordingly, the retire stage 614 can hold received instructions in a completed but unretired state for a designated period of time to permit the voltage monitor 630 to detect voltage emergencies.

In an embodiment, the instruction pipeline 610 employs the voltage emergency signal provided by the voltage monitor 630 to indicate detection of a pipeline resource conflict. In particular, in response to detecting that multiple instructions have been assigned the same pipeline resource, or that multiple instructions have attempted to write to an assigned pipeline resource, the instruction pipeline 110 indicates an error to the voltage monitor 630. In response, the voltage monitor 630 asserts the voltage emergency signal. By using the voltage emergency signal to indicate both voltage emergencies and pipeline resource conflicts, a common pipeline recovery scheme can be implemented for both types of error, simplifying the data processor design.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
setting a first indicator to indicate that a first pipeline resource of a data processor is assigned to a first instruction in response to assigning the first pipeline resource to the first instruction so that the first pipeline resource is temporarily uniquely assigned to the first instruction during execution of the first instruction; and
in response to a second instruction being assigned the first pipeline resource when the first indicator is set, indicating an error.

2. The method of claim 1, further comprising:
setting a second indicator to indicate that a second pipeline resource of the data processor is assigned to the first instruction; and
in response to a third instruction accessing the second pipeline resource when the second indicator is set, indicating the error.

3. The method of claim 1, wherein the first pipeline resource is selected from the group consisting of: a register in a register file, a storage location in an instruction retire queue, a storage location in a re-order buffer, and a storage location in a load/store queue.

4. The method of claim 1, further comprising flushing an instruction pipeline in response to the error.

5. The method of claim 4, further comprising returning the instruction pipeline to a stored architectural state in response to the error.

6. The method of claim 1, further comprising clearing the first indicator to indicate the first pipeline resource is available for assignment in response to an indication that the first instruction has retired.

7. The method of claim 1, further comprising clearing the first indicator in response to determining a threshold amount of time has elapsed without an execution error for an instruction pipeline.

8. The method of claim 7, wherein indicating the execution error comprises asserting a voltage emergency signal employed by a voltage monitor to indicate that a voltage supplied to the data processor has dropped below a threshold level.

9. A method, comprising:
setting a first indicator to indicate that a pipeline resource of a data processor is assigned to a first instruction;
setting a second indicator in response to detecting a first write to the pipeline resource; and
indicating an error in response to detecting a second write to the pipeline resource while the first indicator and the second indicator are set.

10. The method of claim 9, further comprising;
indicating the error in response to detecting an attempt to assign the pipeline resource to a second instruction while the first indicator is set.

11. The method of claim 9, wherein the pipeline resource comprises a register.

12. The method of claim 9, further comprising clearing the second indicator in response to determining a branch misprediction at an instruction pipeline associated with the pipeline resource.

13. A data processor comprising:
an instruction pipeline having a plurality of pipeline resources;
a plurality of indicators, each of the plurality of indicators to indicate whether a corresponding one of the plurality of pipeline resources is assigned to an instruction at the instruction pipeline so that the one of the plurality of pipeline resources is temporarily uniquely assigned to the instruction during the execution of the instruction; and
the instruction pipeline to indicate an error in response to determining a first instruction has accessed one of the plurality of pipeline resources when the one of the plurality of pipeline resources is assigned to a second instruction based on the plurality of indicators.

14. The data processor of claim 13, wherein the one of the plurality of pipeline resources is selected from the group consisting of: a register in a physical register file, a storage location in an instruction retire queue, a storage location in a re-order buffer, and a storage location in a load/store queue.

15. The data processor of claim 13, further comprising a control module to flush the instruction pipeline in response to the error.

16. The data processor of claim 15, wherein the control module is to return the instruction pipeline to a stored architectural state in response to the error.

17. The data processor of claim 13, wherein the instruction pipeline is to clear one of the plurality of indicators to indicate the first pipeline resource is available for assignment in response to an indication that the second instruction has retired.

18. The data processor of claim 17, wherein the instruction pipeline is to clear the one of the plurality of indicators in response to determining a threshold amount of time has elapsed since the first instruction has retired without an error for the instruction pipeline being indicated.

19. The data processor of claim 13, wherein the instruction pipeline is to clear the first indicator to indicate the first pipeline resource is available for assignment in response to an indication of a branch misprediction at the instruction pipeline.

20. The data processor of claim 13, further comprising:
a voltage supply; and
a voltage monitor to indicate via an assertion of a voltage emergency signal when a voltage supplied by the voltage supply is below a threshold, the voltage monitor to assert the voltage emergency signal in response to the error.

* * * * *